US008411229B2

(12) United States Patent  
Choo et al.

(10) Patent No.: US 8,411,229 B2  
(45) Date of Patent: Apr. 2, 2013

(54) BACKLIGHT UNIT AND LIQUID CRYSTAL DISPLAY DEVICE HAVING THE SAME FOR IMPROVING IMAGE QUALITY

(75) Inventors: Min Wha Choo, Gyeongsangbuk-do (KR); Sung Han Jung, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 983 days.

(21) Appl. No.: 12/005,350

(22) Filed: Dec. 27, 2007

(65) Prior Publication Data  
US 2009/0002598 A1 Jan. 1, 2009

(30) Foreign Application Priority Data  
Jun. 28, 2007 (KR) .................. 10-2007-0064396

(51) Int. Cl.  
G02F 1/1335 (2006.01)  
A47F 3/00 (2006.01)  
G09F 12/04 (2006.01)

(52) U.S. Cl. ............... 349/64; 349/61; 349/62; 349/65; 362/561; 362/97.2

(58) Field of Classification Search .................... 349/59, 349/62, 65, 61, 64; 362/561, 97.2  
See application file for complete search history.

(56) References Cited

U.S. PATENT DOCUMENTS

| | | | |
|---|---|---|---|
| 5,046,826 A * | 9/1991 | Iwamoto et al. ............... | 349/65 |
| 2004/0109306 A1* | 6/2004 | Lee ................................. | 362/31 |
| 2005/0046765 A1* | 3/2005 | Liu ................................. | 349/61 |
| 2007/0008457 A1* | 1/2007 | Takahashi et al. ............. | 349/64 |

* cited by examiner

Primary Examiner — Lauren Nguyen  
(74) Attorney, Agent, or Firm — Morgan, Lewis & Bockius LLP

(57) ABSTRACT

Provided is a backlight unit with an extending portion that extends from one of a plurality of sheets included in an optical sheet. The optical sheet is on a light guide plate, and a light emitting diode chip is disposed at a side of the light guide plate. A portion of a flexible printed circuit board, to which the light emitting diode chip is mounted, overlaps a portion of the light guide plate. The extending portion overlaps the portion of the flexible printed circuit board. Thus, the occurrence of lines of light due to light progressing between the light guide plate and the flexible printed circuit board can be prevented, thereby obtaining uniform brightness and improving image quality.

10 Claims, 3 Drawing Sheets

BACKLIGHT UNIT AND LIQUID CRYSTAL DISPLAY DEVICE HAVING THE SAME FOR IMPROVING IMAGE QUALITY

This nonprovisional application claims priority under 35 U.S.C. §119(a) on Patent Application No. 064396/2007 filed in Republic of Korea on Jun. 28, 2007, the entire contents of which are hereby incorporated by reference.

BACKGROUND

1. Field of the Invention

The invention relates to a backlight unit, and more particularly, to a backlight unit capable of improving image quality and a liquid crystal display (LCD) device having the backlight unit.

2. Related Art

Cathode ray tubes (CRT) are widely used for televisions and monitors for measurement devices, information terminals, etc. However, due to the innate weight and size of CRTs, it is difficult to aggressively deal with the miniaturization and weight reduction of electronic devices.

In contrast, LCD devices have the advantages of light-weight, low consumption power, full color, high resolution, and large scale compared with CRTs. Thus, LCD devices are used in a wide range of fields.

Since LCD devices are light-receiving type device that adjust the amount of light supplied from an external source to display an image, LCD devices require a backlight unit to emit light. According to the positions from which light is emitted, backlight units are largely divided into edge-type and top-bottom-type units. A backlight unit may include a light source that emits light. Types of the light source includes an electro luminescence (EL), light emitting diode (LED), cold cathode fluorescent lamp (CCFL), external electrode fluorescent lamp (EEFL), and hot cathode fluorescent lamp (HCFL).

An LED backlight unit that has an almost limitless service life, high brightness, and capability of being miniaturized is being developed. This LED backlight unit is applicable in everything from the smallest display devices to large-scale display devices.

FIG. 4 is a perspective view of an LCD device according to the related art. Referring to FIG. 4, a reflective plate 116 and the light guide plate 115 are held in the molded frame 117, the LED chip 121 is disposed so that its top surface faces the bottom of the holding space 117a at one side of the molded frame 117, and the LED chip 121 is mounted to a flexible PCB 118. The flexible PCB 118 is disposed between a protruded portion 115a and the molded frame 117. That is, a first portion 118a of the flexible PCB 118 is disposed on the molded frame 117, and a second portion 118b of the flexible PCB 118 is disposed over the protruded portion 115a of the light guide plate 115. The protruded portion has a slanted and protruded shape. However, as the flexible PCB 118 is not attached to the light guide plate 115, a gap is generated between the flexible PCB 118 and the protruded portion 115a of the light guide plate 115.

An optical sheet 114 is disposed on the light diffusion plate 115. The optical sheet 114 may include a diffusion sheet 114a and first and second prism sheets 114b and 114c.

An LCD panel 10 including a color filter substrate 100a and an array substrate 100b may be disposed on the light guide plate 115. An upper polarizing plate 130a and a lower polarizing plate 130b are attached respectively to the top and bottom surfaces of the LCD panel 100.

A backlight unit includes the flexible PCB 118 on which an LED chip 121 is mounted, the light guide plate 115, a reflective plate 116, and the optical sheet 114.

A light-shielding tape 112 maybe interposed between the light guide plate 115 and the LCD panel 110 to block light leaking upward from the edges of the light guide plate 115. However, in a related art LED backlight unit, there is a gap between the PCB and the light guide plate, so that the red, green, and blue light is progressed parallel to the light guide plate through the gap. In this case, since the emitted directions of each light have high brightness compared to other directions, light is radiated in lines. Since light emitted in lines cannot obtain uniform brightness, image quality deteriorates.

SUMMARY OF THE INVENTION

Accordingly, embodiments of the invention is directed to a backlight unit and a liquid crystal display device having the same that substantially obviates one or more of the problems due to limitations and disadvantages of the related art.

Embodiments provide a backlight unit capable of preventing light emitted in lines by expanding a portion of an optical sheet and overlapping the portion of the optical sheet with a PCB, thereby obtaining brightness uniformity and improving image quality, and LCD devices having the backlight unit.

Additional advantages, objects and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In a first embodiment of the invention, a backlight unit includes: a light guide plate; a light source at a side of the light guide plate; a flexible printed circuit board (PCB) in which the light source is mounted, and a portion of which overlapping a portion of the light guide plate; an optical sheet on the light guide plate and including a plurality of sheets; and an extending portion extending from the optical sheet, wherein the extending portion overlaps the portion of the flexible printed circuit board.

In a second embodiment of the invention, a liquid crystal display device includes: a liquid crystal display panel; and a backlight unit including a light guide plate emitting surface light on the liquid crystal display panel, a light source at a side of the light guide plate and emitting light toward the light guide plate, a flexible printed circuit board in which the light source is mounted, and a portion of which overlapping a portion of the light guide plate, an optical sheet on the light guide plate and including a plurality of sheets, and an extending portion extending from the optical sheet, wherein the extending portion overlaps the portion of the flexible printed circuit board.

It is to be understood that both the foregoing general description and the following detailed description of the invention are exemplary and explanatory, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principles of the disclosure, in which.

DETAILED DESCRIPTION OF THE PREFERRED EMBODIMENTS

Reference will now be made in detail to the embodiments of the invention, examples of which are illustrated in the accompanying drawings.

Figure 1:
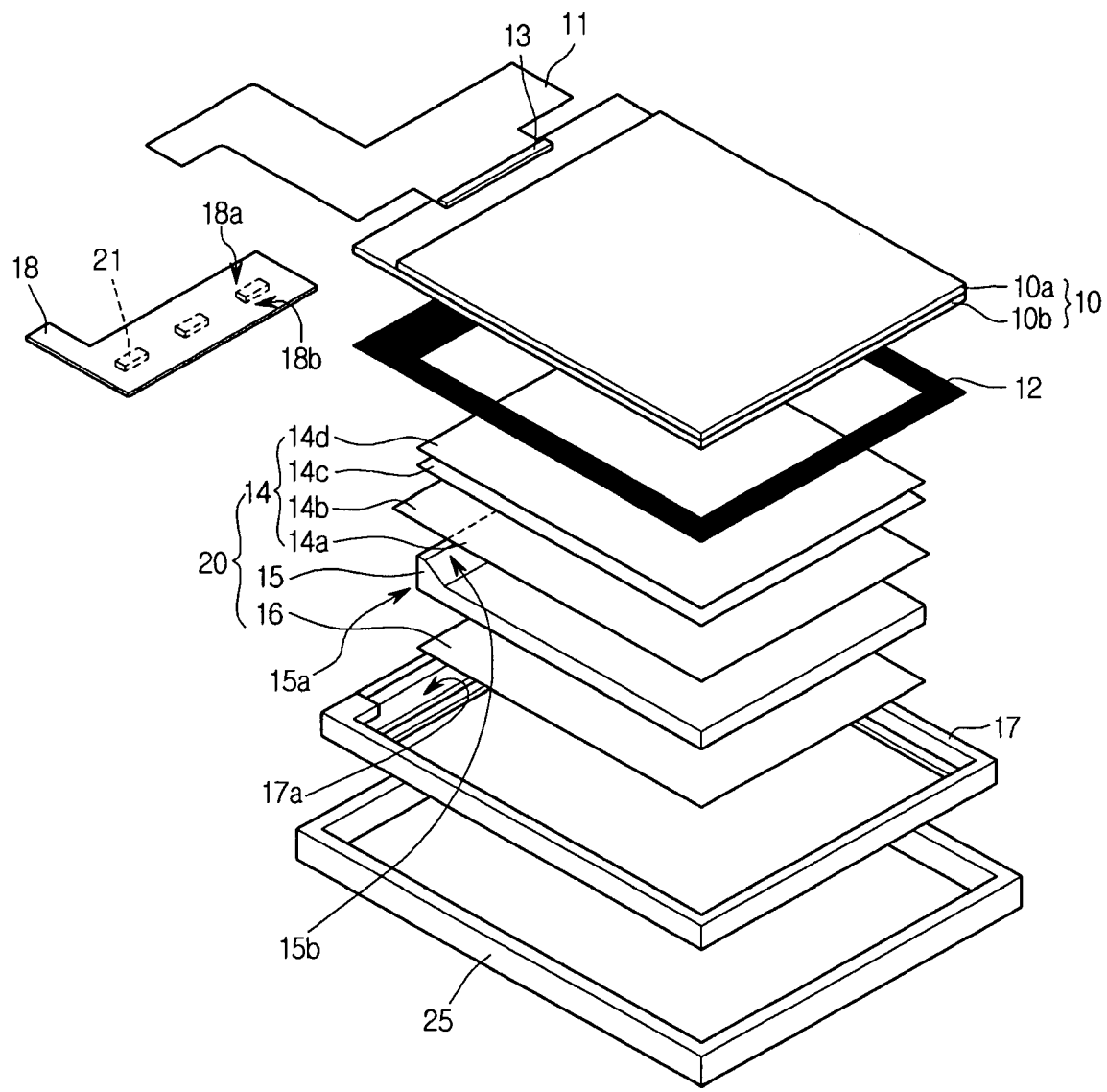
FIG. 1 is a perspective view of an LCD device according to an embodiment of the invention.

FIG. 1 is an exploded perspective view of an LCD device according to an of the invention.

Referring to FIG. 1, an LCD device includes an LCD panel 10 that displays an image, and a backlight unit 20 disposed on the rear side of the LCD panel 10 to provide light. The LCD device may also include a molded frame 17 that holds and secures the LCD panel 10 and the backlight unit 20, and a light-shielding tape 12 disposed between the LCD panel 10 and the backlight unit 20.

The LCD panel 10 includes a color filter substrate 10a, an array substrate 10b, and a liquid crystal layer (not shown) interposed between the color filter substrate 10a and the array substrate 10b. The color filter substrate 10a has a plurality of red color filters, green color filters, and blue color filters, and the array substrate 10b has a plurality of thin film transistors (TFT) and pixel electrodes.

The pad region of the LCD panel 10 includes a circuit substrate 11 that supplies a data signal and a driving signal, and a driver 13 for driving the LCD panel 10.

The circuit substrate 11 is a flexible insulating film on which various driven devices are attached, and may be a heat resistant plastic film such as a polyester (PET) or a polyimide (PI).

The backlight unit 20 includes a flexible PCB 18, an LED chip 21, a light guide plate 15, an optical sheet 14, and a reflective plate 16, the LED chip 21 functions as a light source, and the light source is not limit to the light emitting diode chip, and other types of lamps, for example an external electrode fluorescent lamp (EEFL) or a cold cathode fluorescent lamp (CCFL) can also be used as the light source.

The flexible PCB 18 is a flexible insulating film, and may be made of a plastic film that is a heat resistant plastic film such as a polyester (PET) or a polyimide (PI). The flexible PCB 18 also has conductive patterns.

The LED chip 21 is disposed on the flexible PCB 18, and is electrically connected to the conductive patterns. The LED chip 21 includes red, green, and blue LEDs, or white LEDs.

The light guide plate 15 is disposed at the side of the LED chip 21, and radiates light incident from the LED chip 21 to the optical sheet 14 as surface light.

The light guide plate 15 includes an incident portion 15a adjacent to the LED chip 21, and a protruded portion 15b protruding to the same height as the LED chip 21 from the remainder of the light guide plate 15, in order to increase the efficiency of light. Thus, the protruded portion 15b protruded to the same height as the LED chip 21 allows most of the light emitted from the LED chip 21 to be incident on the light guide plate 15, increasing lighting efficiency. The protruded portion 15b may be formed along the incident portion 15a of the light guide plate 15. Here, a portion of the flexible PCB 18 may be disposed to overlap on at least the protruded portion 15b.

The molded frame 17 is provided with a holding space 17a in which the LED chip 21 mounted to the flexible PCB 18 is inserted. The LED chip 21 is disposed on the flexible PCB 18 toward the molded frame 17. Thus, a first portion 18a of the flexible PCB 18 is seated in the molded frame 17, and a second portion 18b of the flexible PCB 18 is mounted to overlap on the light guide plate 15. The first portion 18a denotes a portion extending from one end of the flexible PCB 18 to the LED chip 21, and the second portion 18b denotes a portion extending from the LED chip 21 to the other end of the flexible PCB 18. The LED chip 21 disposed between the first and second portions 18a and 18b is inserted into the holding space 17a. The undersurface of the LED chip 21 may or may not contact the top surface of the molded frame 17.

Figure 4:
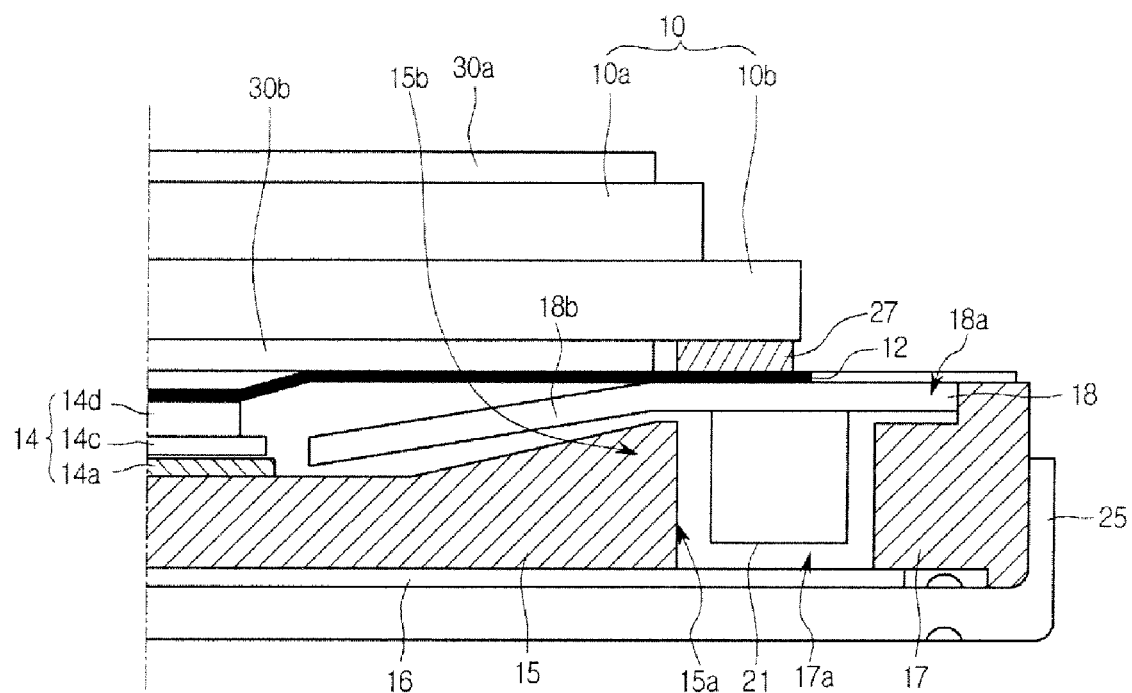
FIG. 4 is a perspective view of an LCD device according to the related art.

In the related art, as shown in FIG. 4, the flexible PCB is not fixed on the light guide plate as above, but is simply placed thereon, so that a gap forms between the flexible PCB and the light guide plate, through which light emitted from the LED chip radiates, such that light is radiated in line shape due to line of more brighter light and another line of more darker light.

In embodiments of the invention, the gaps between the flexible PCB and the light guide plate block, preventing the occurrence of lines of light.

The optical sheet 14 diffuses and controls direct light emitted from the light guide plate 15. The optical sheet 14 may sequentially include a diffusion sheet 14a and a first and second prism 14c and 14d proximate to the light guide plate 15. To protect the second prism sheet 14d, a first protective sheet (not shown) may be disposed on the second prism sheet 14d. Also, a second protective sheet (not shown) for protecting the diffusion sheet 14a may be disposed beneath the diffusion sheet 14a.

An extending portion 14b may be formed in any one of the plurality of sheets 14a, 14c, and 14d included in the optical sheet 14. For example, the extending portion 14b may be formed in the diffusion sheet 14a to overlap with a portion of the flexible PCB 18. The extending portion 14b extends from the light guide plate toward the light emitting diode chip 21. The extending portion 14b may be integrally formed with the diffusion sheet 14a. While the extending portion 14b is described in the present embodiment as being formed on the diffusion sheet 14a, the extending portion 14b may alternately be formed on any one of the sheets other than the diffusion sheet 14a—for example, one of the first and second prism sheets 14c and 14d or the first and second protective sheets.

The extending portion 14b may be disposed to overlap with the second portion 18b of the flexible PCB 18. Being disposed on the flexible PCB 18, the extending portion 14b blocks light from the LED chip 21 from passing through a gap between the flexible PCB 18 and the light guide plate 15 and prevents the light from progressing along the light guide plate 15, so that the occurrence of lines of light is prevented. Accordingly, uniform brightness can be realized across the light guide plate 15, and the uniform brightness is incident on the LCD panel 10, to improve the image output from the LCD panel 10.

A reflective plate 16 for reflecting light emitted toward the rear of the light guide plate 15 may be disposed on the rear surface of the light guide plate 15.

The reflective plate 16 and the light guide plate 15 are stacked in the molded frame 17, and the flexible PCB 18 is inserted and mounted in the molded frame 17, so that the LED chip 21 is inserted into the holding space 17a of the molded frame 17. The optical sheet 14 is seated on the light guide plate 15, and the extending portion 14b of the diffusion sheet 14a overlaps with a portion of the flexible PCB 18.

The light-shielding tape 12 is adhered between the edges of the optical sheet 14 and the flexible PCB 18.

The LCD panel 10 is disposed on the optical sheet 14 with the light-shielding tape 12 in between. The light-shielding tape 12 may be disposed along the edge of the LCD panel 10.

The molded frame 17 is fixed and fastened by a lower cover 25. While not shown, the lower cover 25 may be fastened to an upper cover disposed along the edge of the LCD panel 10.

While the LED chip 21 is described in the present embodiment as disposed on only one side of the light guide plate 15, a first and second LED chips 21 may be disposed respectively on both sides of the light guide plate 15. In the latter case, a first and second protruding portion 15b may be formed on a first and second incident portion 15a, respectively, and a first and second extending portion 14b may be formed respectively on both sides of the diffusion sheet 14a. The first and second extending portions 14b may be disposed to overlap with the first and second flexible PCBs 18 in which the first and second LED chips 21 are respectively mounted. The second LED chip, the second flexible PCB, the second extending portion and the second protruding portion have an substantially symmetry position relationship with the first LED chip, the first flexible PCB, the first extending portion and the first protruding portion with respect to the light guide plate, respectively. Therefore, the occurrence of lines of light through light emitted from the first and second LED chips 21 and progressing toward the center of the light guide plate 15 can be prevented.

Figure 2:
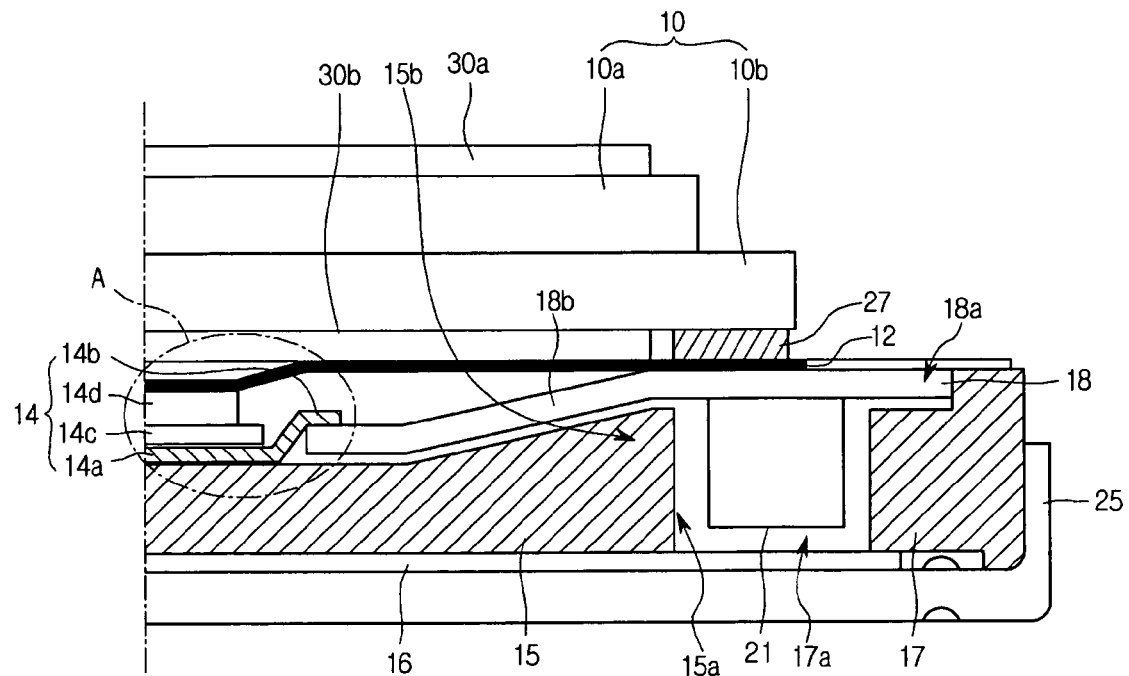
FIG. 2 is a sectional view of the LCD in FIG. 1 in an assembled state.
Figure 3:
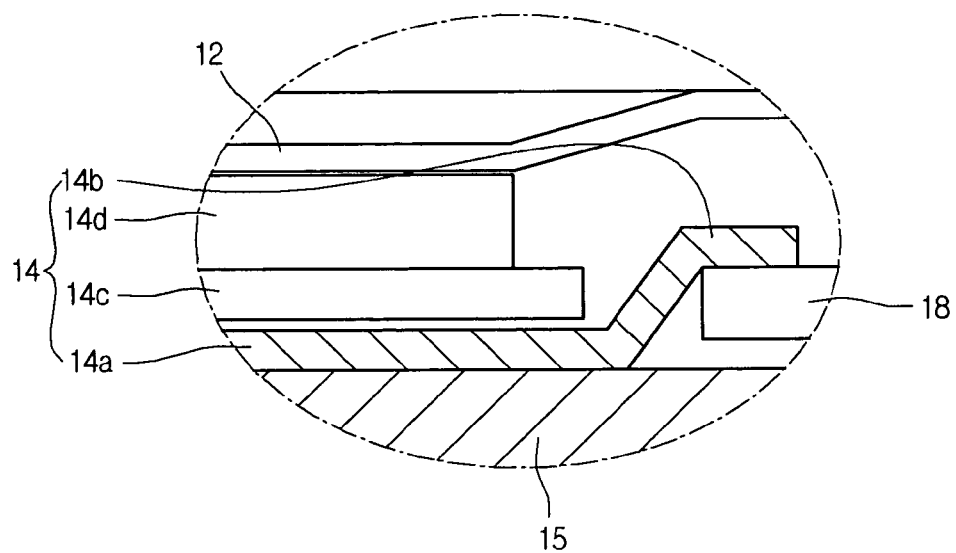
FIG. 3 is an enlarged view of region A in FIG. 2.

FIG. 2 is a sectional view of the LCD in FIG. 1 in an assembled state, and FIG. 3 is an enlarged view of region A in FIG. 2.

Referring to FIGS. 1 to 3, the reflective plate 16 and the light guide plate 15 are held in the molded frame 17, the LED chip 21 is disposed so that its top surface faces the bottom of the holding space 17a at one side of the molded frame 17, and the LED chip 21 is mounted to the flexible PCB 18. The first portion 18a of the flexible PCB 18 is mounted on the molded frame 17, and the second portion 18b is disposed to overlap on the incident portion 15a of the light guide plate 15.

The optical sheet 14 is disposed on the light diffusion plate 15. The optical sheet 14 may include the diffusion sheet 14a and the first and second prism sheets 14c and 14d. First and second protective sheets may be provided on the top surface of the second prism sheet 14d and the undersurface of the diffusion sheet 14a, respectively.

An LCD panel 10 including a color filter substrate 10a and an array substrate 10b may be disposed on the light guide plate 15. An upper polarizing plate 30a and a lower polarizing plate 30b are attached respectively to the top and bottom surfaces of the LCD panel 10.

A backlight unit is formed of a flexible PCB 18 on which an LED chip 21 is mounted, a light guide plate 15, a reflective plate 16, and an optical sheet 14.

The LCD panel 10 and the backlight unit 20 can be held in the molded frame 17.

The light-shielding tape 12 may be interposed between the light guide plate 15 and the LCD panel 10. That is, the light-shielding tape 12 may be attached on the edges of the light guide plate 15 and the flexible PCB 18, and the LCD panel 10 may be mounted on the light-shielding tape 12. The light-shielding tape 12 may be disposed to block light leaking upward from the edges of the light guide plate 15. The LCD panel 10 may be adhered to the light-shielding tape 12 through a double-sided tape 27. If an adhesive is provided on the top surface of the light-shielding tape 12, the LCD panel 10 may be directly attached to the light-shielding tape 12, so that double-sided tape 27 is not needed.

One of the plurality of sheets 14a, 14c, and 14d included in the optical sheet 14—for example, the diffusion sheet 14a may have an extending portion 14b. The extending portion 14b may be formed integrally with the diffusion sheet 14a. While in the present embodiment, the extending portion 14b is described as extending from the diffusion sheet 14a, the extending portion 14b may alternately be formed to extend from one of the first and second prism sheets 14c and 14d or the first and second protective sheets.

The extending portion 14b may be disposed to overlap with the second portion 18b of the flexible PCB 18. The extending portion 14b may overlap with the entire surface of the second portion 18b of the flexible PCB 18 or part of the second portion 18b. When the extending portion 14b thus overlaps with the second portion 18b of the flexible PCB 18, light leaking between the flexible PCB 18 and the light guide plate 15 and progressing parallel to the light guide plate 15 is blocked. Accordingly, the occurrence of the lines of the light due to the leaked light progressing parallel to the light guide plate 15 is prevented, so that uniform brightness may be obtained from the light guide plate 15, and the uniformly bright light is incident on the LCD panel 10 to improve image quality.

While the extending portion 14b has thus far been described as extending from only one of the sheets 14a, 14c, and 14d included in the optical sheet 14 according to the present embodiments, the extending portion 14b may be formed on each of the sheets 14a, 14c, and 14d included in the optical sheet 14. In this case, the extending portions 14b formed on each of the sheets 14a, 14c, and 14d may be disposed to overlap with the second portion 18b of the flexible PCB 18.

In embodiments of the invention, the sheets corresponding to the incident portions of the light guide plate are extended to form an extending portion, and the extending portion is disposed to overlap with a portion of the flexible PCB, so that the occurrence of lines of light due to light progressing parallel to the light guide plate through a gap between the light guide plate and the flexible PCB can be prevented. Since the occurrence of lines of light is prevented, uniform brightness can be obtained and image quality can be improved.

It will be apparent to those skilled in the art that various modifications and variations can be made in the invention. Thus it is intended that the invention covers the modifications and variations of this disclosure provided they come within the scope of the appended claims and their equivalents.

What is claimed is:

1. A backlight unit comprising:
a light guide plate;
a light source at a side of the light guide plate;
a flexible printed circuit board in which the light source is mounted, and a portion of which overlapping a portion of the light guide plate;
an optical sheet on the light guide plate and including a plurality of sheets; and
an extending portion extending from the optical sheet,
wherein the extending portion overlaps the portion of the flexible printed circuit board,
wherein the light guide plate includes a protruding portion at a region where light is incident, the protruding portion protruding in an upper direction from the light guide plate,
wherein the light source is disposed at the incident region of the light guide plate, wherein the protruding portion is substantially the same thickness as the light source, wherein the flexible printed circuit board is disposed on the protruding portion of the light guide plate and the light source, wherein the extending portion is contacted on the portion of the flexible printed circuit board, wherein the extending portion extends from one sheet of the plurality of sheets, wherein the sheet having the extending portion is directly contacted with the light guide plate, wherein the extending portion extends from the light guide plate toward the light source, wherein the extending portion is overlapped with the edge of the portion of the flexible printed circuit board corresponding to the protruding portion of the light guide plate, wherein the width of the extending portion is the same as the width of the optical sheet, and wherein the length of the bottom sheet is longer than the length of the upper sheets.

2. The backlight unit according to claim 1, wherein the light source is light emitting diode chip.

3. The backlight unit according to claim 1, wherein the portion of the flexible printed circuit board extends from the light source to an end of the flexible printed circuit board toward the light guide plate.

4. The backlight unit according to claim 2, wherein the light emitting diode chip comprises a red light emitting diode, a green light emitting diode, and a blue light emitting diode.

5. The backlight unit according to claim 2, wherein the light emitting diode chip comprises white light emitting diodes.

6. The backlight unit according to claim 1, wherein the plurality of sheets comprises a diffusion sheet, a prism sheet, and a protective sheet.

7. The backlight unit according to claim 1, wherein the extending portion is integrally formed with the one sheet.

8. The backlight unit according to claim 1, further comprising a reflective plate at an undersurface of the light guide plate.

9. A liquid crystal display device comprising:
a liquid crystal display panel; and
a backlight unit including a light guide plate emitting surface light on the liquid crystal display panel, a light emitting diode chip at a side of the light guide plate and emitting light toward the light guide plate, a flexible printed circuit board in which the light emitting diode chip is mounted, and a portion of which overlaps a portion on the light guide plate, an optical sheet on the light guide plate and including a plurality of sheets, and an extending portion extending from the optical sheet, wherein the extending portion overlaps a portion of the flexible printed circuit board, wherein the light guide plate includes a protruding portion at a region where light is incident, the protruding portion protruding in an upper direction from the light guide plate, wherein the light source is disposed at the incident region of the light guide plate, wherein the protruding portion is substantially the same thickness as the light source, wherein the flexible printed circuit board is disposed on the protruding portion of the light guide plate and the light source, wherein the extending portion is contacted on the portion of the flexible printed circuit board, wherein the extending portion extends from one sheet of the plurality of sheets, wherein the sheet having the extending portion is directly contacted with the light guide plate, wherein the extending portion extends from the light guide plate toward the light source, wherein the extending portion is overlapped with the edge of the portion of the flexible printed circuit board corresponding to the protruding portion of the light guide plate, wherein the width of the extending portion is the same as the width of the optical sheet, and wherein the length of the bottom sheet is longer than the length of the upper sheets.

10. The backlight unit according to claim 1, wherein the width of the extending portion is larger than the width of the flexible printed circuit board.

* * * * *